US011755797B2

(12) United States Patent
Winefeld (10) Patent No.: US 11,755,797 B2
(45) Date of Patent: Sep. 12, 2023

(54) SYSTEM AND METHOD FOR PREDICTING PERFORMANCE, POWER AND AREA BEHAVIOR OF SOFT IP COMPONENTS IN INTEGRATED CIRCUIT DESIGN

(71) Applicant: ARTERIS, INC., Campbell, CA (US)

(72) Inventor: Benny Winefeld, Palo Alto, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

(21) Appl. No.: 17/202,277

(22) Filed: Mar. 15, 2021

(65) Prior Publication Data

US 2021/0200925 A1 Jul. 1, 2021

Related U.S. Application Data

(63) Continuation of application No. 16/685,823, filed on Nov. 15, 2019, now Pat. No. 10,949,585.

(51) Int. Cl.
| | |
|---|---|
| *G06F 30/327* | (2020.01) |
| *G06N 20/00* | (2019.01) |
| *G06N 3/08* | (2023.01) |
| *G06F 30/35* | (2020.01) |

(52) U.S. Cl.
CPC ............ *G06F 30/327* (2020.01); *G06F 30/35* (2020.01); *G06N 3/08* (2013.01); *G06N 20/00* (2019.01)

(58) Field of Classification Search
CPC ........ G06F 30/327; G06F 30/35; G06N 20/00
USPC ......................................................... 716/104
See application file for complete search history.

(56) References Cited

U.S. PATENT DOCUMENTS

| | | | |
|---|---|---|---|
| 5,555,201 A | 9/1996 | Dangelo et al. | |
| 5,598,344 A * | 1/1997 | Dangelo | G06F 30/33 |
| | | | 716/135 |
| 8,863,052 B1 | 10/2014 | Dhuria et al. | |
| 9,275,178 B1 * | 3/2016 | Fung | G06F 30/3312 |
| 2006/0253810 A1 * | 11/2006 | Guardiani | G06F 30/398 |
| | | | 716/54 |
| 2007/0083831 A1 * | 4/2007 | Hamilton | G06F 30/30 |
| | | | 716/108 |
| 2016/0233134 A1 * | 8/2016 | Lim | H01L 22/32 |
| 2017/0337319 A1 * | 11/2017 | Camus | G06F 30/3312 |
| 2019/0266307 A1 * | 8/2019 | Rao | G06F 30/33 |

FOREIGN PATENT DOCUMENTS

| | | |
|---|---|---|
| CN | 103123658 A | 5/2013 |
| CN | 109960879 A | 7/2019 |

\* cited by examiner

*Primary Examiner* — Suchin Parihar
(74) *Attorney, Agent, or Firm* — Dana Legal Services; Jubin Dana (57) ABSTRACT

A system, and corresponding method, is described for using a model to predict the physical behavior of IP from an HDL representation of the IP. The system generated data for training and testing the model by treating the logical parameters and physical parameters subset as one for the IP block. The system digitizes the non-numerical parameters and compresses timing arcs. The system uses the trained model to characteristic behavior for an IP block directly from the combined vector of logical parameter values and physical parameter values.

19 Claims, 6 Drawing Sheets

Enums can be converted to one-hot vectors.
Ex "ss" => [0 0 1], "tt" => [0 1 0] , "ff" => [1 0 0]

SYSTEM AND METHOD FOR PREDICTING PERFORMANCE, POWER AND AREA BEHAVIOR OF SOFT IP COMPONENTS IN INTEGRATED CIRCUIT DESIGN

CROSS REFERENCE TO RELATED APPLICATION

This application is a continuation of U.S. Non-Provisional application Ser. No. 16/685,823 filed on Nov. 15, 2019 and titled SYSTEM AND METHOD FOR PREDICTING PERFORMANCE, POWER AND AREA BEHAVIOR OF SOFT IP COMPONENTS IN INTEGRATED CIRCUIT DESIGN by Benny WINEFELD, which issued as U.S. Pat. No. 10,949,585 on Mar. 16, 2021, the entire disclosure of which is incorporated herein by reference.

FIELD OF THE INVENTION

The invention is in the field of system design and, more specifically, related to estimation of any one or more characteristics for intellectual property (IP) blocks.

BACKGROUND

Intellectual property (IP) blocks or elements or cores are used in chip design. The IP represents a discrete component used in design. The IP is a reusable component of design logic with a defined interface and behavior that has been verified and can be integrated into a larger design. The IP is typically in the form of soft IP or hard IP. Hard IP is defined as IP that cannot be modified. The hard IP's application function cannot be meaningfully modified by designers.

On the other hand, soft IP includes configurable logical descriptions. The soft IP includes synthesizable cores that are delivered or represented, for example, in hardware description language (HDL), such as Verilog or VHSIC HDL (VHSL). This allows designers to modify designs at the functional level. Soft IP is also sometimes offered as generic gate-level netlists. The netlist is a boolean-algebra representation of the IP's logical function implemented as generic gates or process specific standard cells. An IP core implemented as generic gates is portable to any process technology. Both netlist and synthesizable cores are called "soft IP" because both allow synthesis, placement and routing (SPR) in the design.

Soft IP that is used in systems-on-chip (SoC) and network-on-chip (NoC) are often represented or written in high level parametrized HDL. In computer system design, HDL is a specialized computer language used to describe the structure and behavior of IPs with electronic circuits or digital logic circuits. This representation enables a precise, formal description of an electronic circuit that allows for the automated analysis and simulation of the IP as an electronic circuit. HDL can also be synthesized into a netlist, which is a specification of physical electronic components and how they are connected together, that can be placed and routed to produce the set of masks used to create the IP as part of an integrated circuit. The HDL looks much like a programming language. HDL is a textual description including expressions, statements and control structures. One important difference between most programming languages and HDLs is that HDLs explicitly include the notion of time. HDLs form an integral part of electronic design automation (EDA) systems, especially for IPs or complex circuits, such as application-specific integrated circuits, microprocessors, and programmable logic devices.

Representation of IPs must be both functionally correct and satisfy physical requirements, which includes power consumption and minimal operating frequency. Traditionally evaluation of performance, power and area (PPA) can only be done when IP is synthesized into a gate level netlist. For large IPs this process can take hours to days, which makes it impractical for the analysis required during early stages of architectural design. Therefore, what is needed is a system and method that allows for the ability to predict the physical behavior of IP directly from its HDL description in order to shorten IP development cycle and provide more optimal solutions.

SUMMARY OF THE INVENTION

A system and method is disclosed for using a machine learning model to predict the physical behavior of IP from an HDL representation of the IP, which shortens the IP development cycle and provides a more optimal solution. In accordance with the various aspects of the invention, any one or more characteristic estimations includes capturing parameters, such as: delays between input and output ports of an IP, the area of an IP, and the power used by the IP. One or more characteristics estimation is a collection of characterization for a particular component of an IP that can be used to build a database for training a machine learning model. The model can use the data collected and provide estimations of behavior for the IP to predict the behavior of an IP core or block directly from a combined vector of the IP's logical and physical parameter values. Thus, machine learning models are trained on data obtained from running each IP component through synthesis and using the one or more characteristics captured under multiple parameter variations. For each specific set of physical conditions, the one or more characteristics information is collected and used to train the model. Some of the data collected is used to test the validity of the machine learning model, while some of the data collected is used to train the machine learning model. In accordance with the various aspects of the invention, the one or more characteristics includes at least one of performance, power, and area (PPA). In accordance with the various aspects of the invention, a composite vector may include the combined vector.

DETAILED DESCRIPTION

The invention is described in accordance with the aspects and embodiments in the following description with reference to the FIGS., in which like numbers represent the same or similar elements. Reference throughout this specification to "one embodiment," "an embodiment," or similar language means that a particular feature, structure, or characteristic described regarding the embodiment is included in at least one embodiment of the invention.

Thus, appearances of the phrases "in one embodiment," "in an embodiment," "in certain embodiments," and similar language throughout this specification may, but do not necessarily, all refer to the same embodiment. It is noted that, as used in this description, the singular forms "a," "an" and "the" include plural referents, unless the context clearly dictates otherwise.

The described features, structures, or characteristics of the invention may be combined in any suitable manner in accordance with the aspects and one or more embodiments of the invention. In the following description, numerous specific details are recited to provide an understanding of various embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring the aspects of the invention.

All publications and patents cited in this specification are herein incorporated by reference as if each individual publication or patent were specifically and individually indicated to be incorporated by reference and are incorporated herein by reference to disclose and describe the methods and/or system in connection with which the publications are cited. The citation of any publication is for its disclosure prior to the filing date and should not be construed as an admission that the invention is not entitled to antedate such publication by virtue of prior invention. Further, the dates of publication provided may be different from the actual publication dates, which may need to be independently confirmed.

A Network-on-Chip (NoC) delivers messages between System-on-Chip (SoC) IPs, such as CPUs and memory controllers. The NoC includes interconnected switches through which messages are steered or passed. The size and speed of each switch depends on the following: 1) the logical parameters, such as the number of input/output ports and the data bus width; and 2) the physical conditions, such as process technology, type of the standard cell library, operating voltage and temperature.

Figure 1:
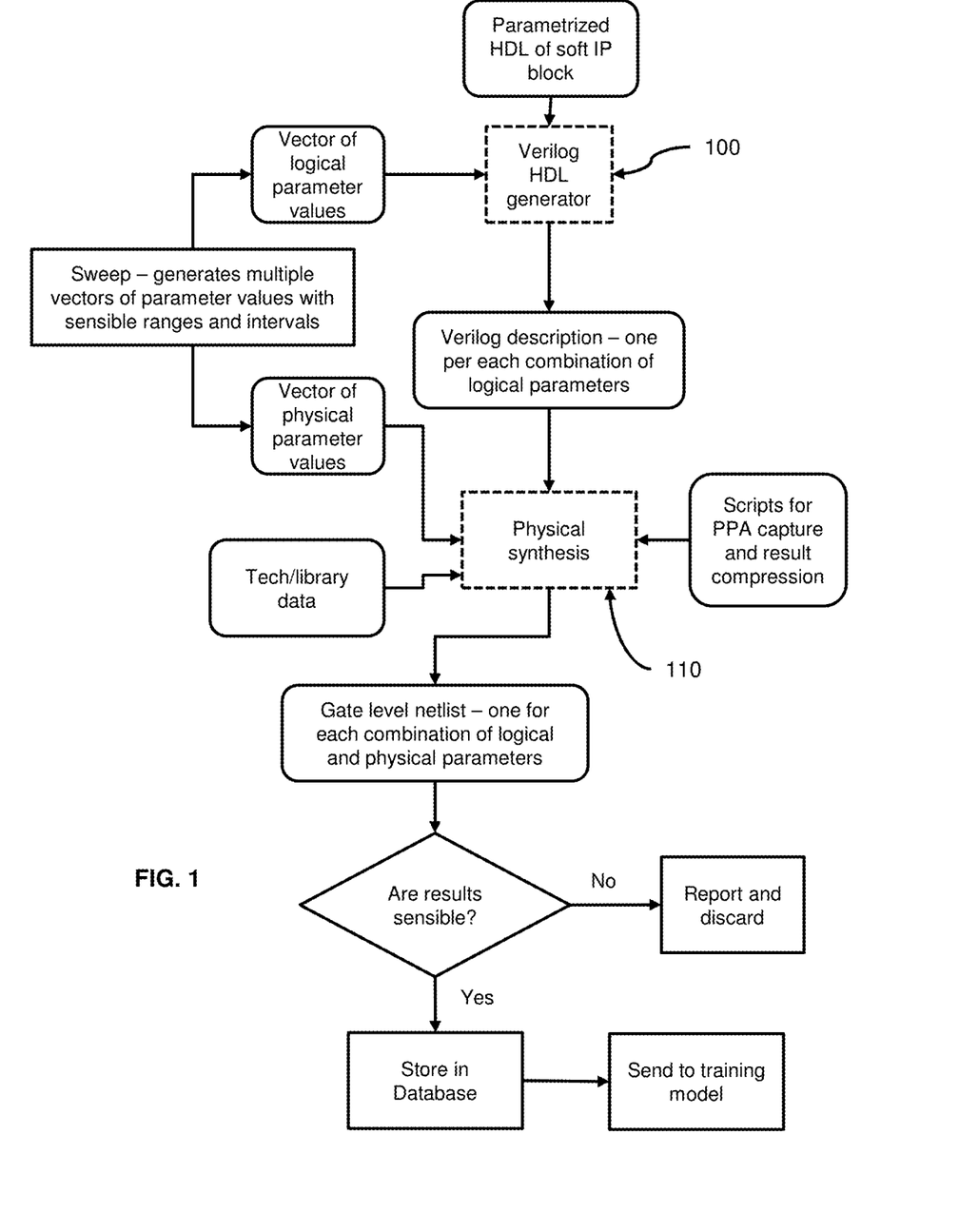
FIG. 1 shows a process for calculating power, performance, and area for a soft IP that is send to a training model according to various aspects of the invention.
Figure 2:
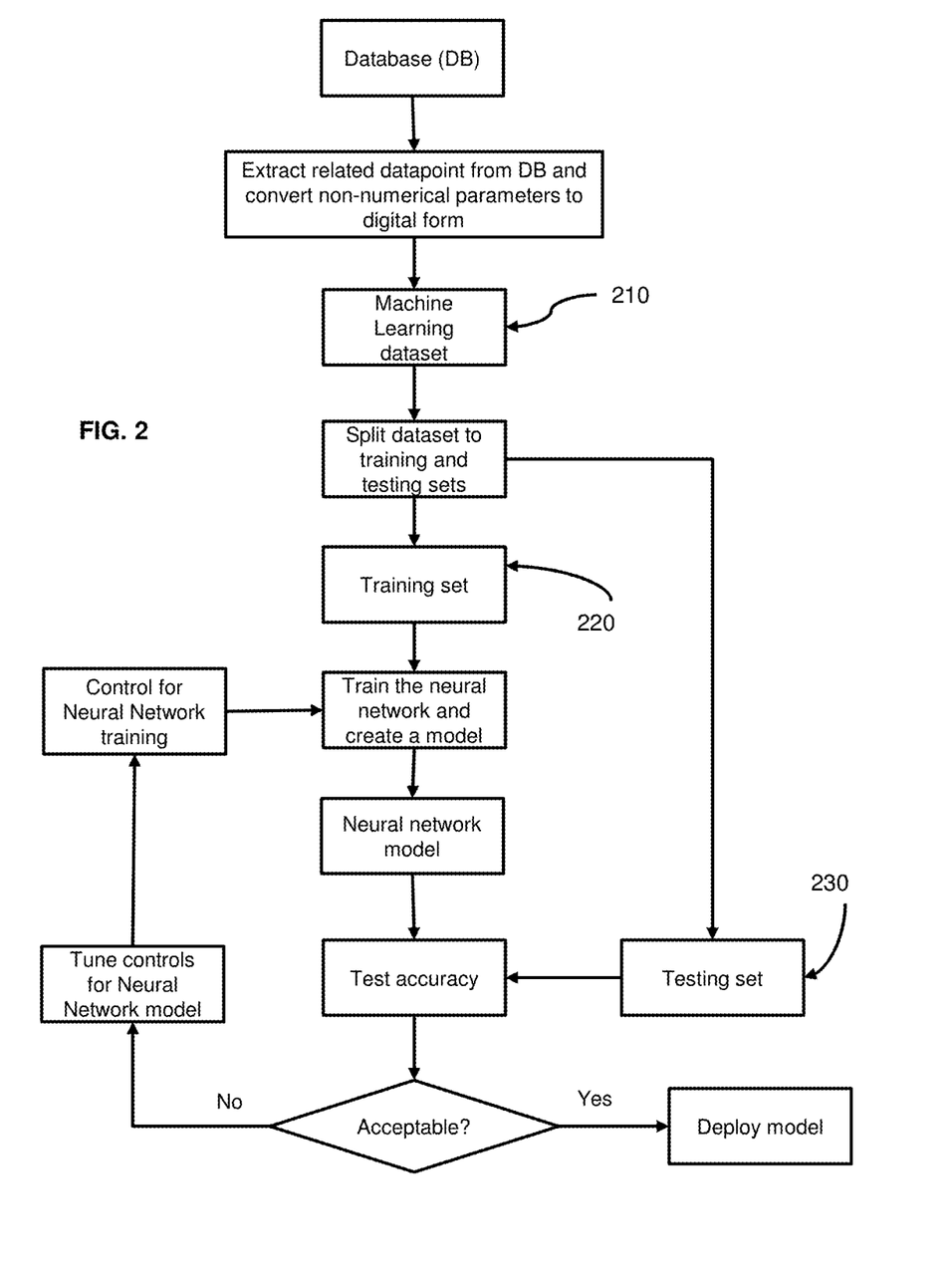
FIG. 2 shows a process for training and testing a model used to predict PPA estimation according to various aspects of the invention.

Referring now to FIG. 1, a process is shown in accordance with the various aspects of the invention, for collecting data sets about IP blocks and using the data sets to estimate performance, power, and area (PPA) for the IP blocks to build a data set for training and testing a machine learning model. As used herein, a machine learning model may be any mathematical representation of a real-world process. The learning algorithm for the model finds patterns in training data, such that the input parameters correspond to a target or outcome. The output or result of the training process is a machine learning model that can accurately determine and/or predict patterns. As used herein, neural networks are a class of models within the general machine learning approach. More specifically, neural networks are a specific set of algorithms that general function approximations, which is why they can be applied to almost any machine learning problem about learning a complex mapping from the input to the output space. The data generated is stored in a database and used to train the machine learning model, which is discussed with respect to FIG. 2 and FIG. 3. Thus, the model allows early prediction for the physical parameters related to PPA. For example, where should register stages be placed and how many? or what size bus fits in the channel? or can a certain size switch operate at the desired speed? or within which clock domain should the switch be placed? or is the intended target latency, between initiator and target, achievable? Collecting information about parameters, such as timing arcs (delay between input and output ports of an IP), area, and power allows PPA characterization.

Referring again to FIG. 1, the process shown produces training data. The training data is generated using vectors for physical parameters and logical parameters that fall within a sensible ranges and intervals. This allows for a more accurate set of data points that will later be used for training the machine learning model. The process then uses vectors of logical parameters as an input to a Verilog hardware description language (HDL) generator 100. The process also includes providing the parameterized HDL for an IP block to the Verilog HDL generator. The Verilog generator produces a Verilog description for each combination of logical parameters. The resulting Verilog descriptions, representing all the combinations, are inputted to a physical synthesis module 110. Additionally, the vector of physical parameter values are provided to the physical synthesis module. The physical synthesis module generates a gate level netlist. The physical synthesis module used library data along with scripts information to generate the gate level netlist for each combination, thus resulting a several gate level netlists. Each gate level netlist is considered to ensure the results are acceptable or sensible. Determining whether results are sensible is a collection of rules based on empirical IC design knowledge. For example, delay through a combinational block of a same complexity should not exceed few nanoseconds. If the resulting gate level netlist is acceptable, then the resulting gate level netlist is stored in a databased. If the resulting gate level netlist is not acceptable, then the result is reported and discarded. The process is repeated for various different IP blocks to generate the gate level netlist and the resulting gate level netlists are stored to build a database for training a machine learning model.

Figure 4:
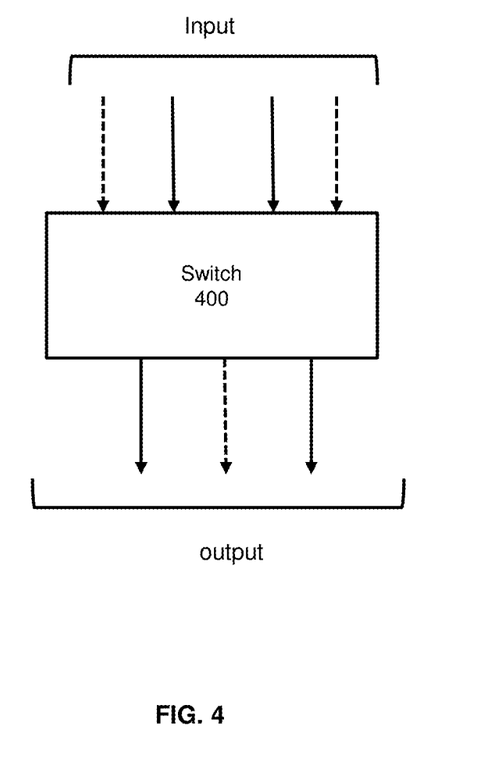
FIG. 4 shows an IP block according to various aspects of the invention.

Continuing with FIG. 1 and referring to FIG. 4, a simple example is provided. The simplicity of the example is not a limitation of the system and is merely simplified for clarity. As noted, data generation is used for training the model based on parametrized HDL as shown in accordance with the various aspects of the invention. Parametrized HDL (high level hardware description language) defines the logical behavior of a highly configurable or mutable IP. For example, a switch 400 is a component that forwards data packets from its input ports to its output ports. According to the various aspects of the invention, the number of switch ports is parametrized. For example, the switch 400 can have 2, 3, or 4 input ports and 2 or 3 output ports. By running an HDL generator for all combinations of these two parameters (input ports and output ports), the result will end up with 3×2=6 conventional (i.e. non-parametric) Verilog descriptions—one for each variant of the switch 400—which are logic descriptions. These logic descriptions are converted to a real circuit by mapping to standard cells from a specific technology. This process is called physical synthesis. Thus, for standard cell libraries from 16 nm and 7 nm technologies, after synthesis there will be 6*2=12 circuit variants. Notice that 16 nm and 7 nm circuits for the same input Verilog will be logically identical; the physical characteristics are different because 7 nm is faster, smaller and takes less power compare to the 16 nm physical characteristic.

Figure 6:
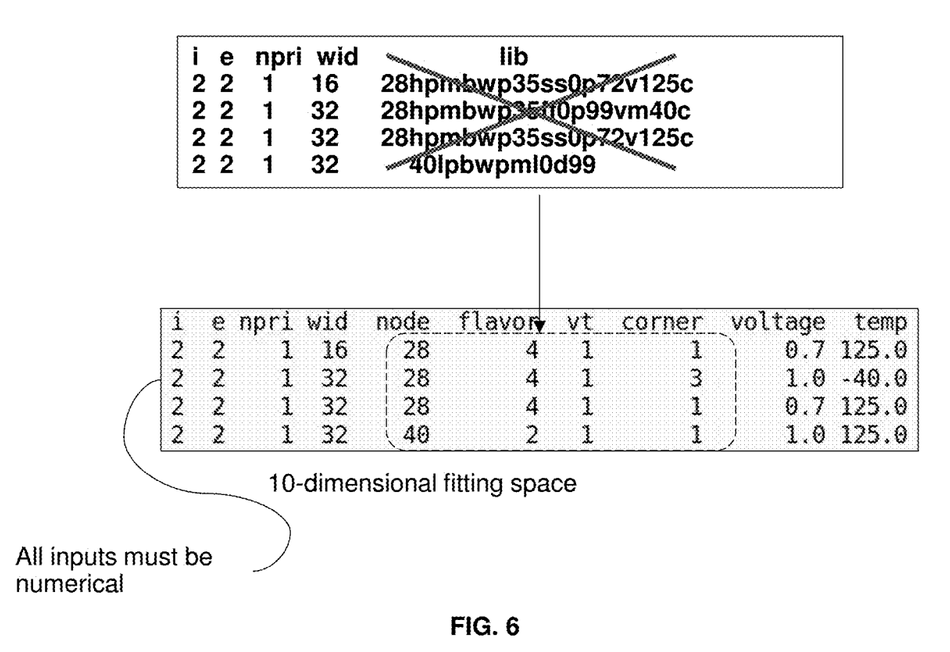
FIG. 6 shows a step in the process for digitizing parameters according to various aspects of the invention.

Referring again to FIG. 2 and FIG. 6, a process is shown for generating training data and testing data for a machine learning model. The process accesses the database and extracts the related datapoints from the database. The non-numerical data parameters are converted to digital form, as shown in FIG. 6, to produce a machine learning dataset 210. The dataset 210 is split into training data 220 and testing data 230. The training data 220 is used to train the neural network model. With the model trained, the test data 230 is used to test the accuracy of the model. If the test results are acceptable, then the model can be deployed and used for estimation and prediction of any one or more characteristics, such as PPA, for the IP clocks. If the test results are not acceptable, then the controls for the neural network model is tuned and the feedback is provided to further train the model.

Figure 3:
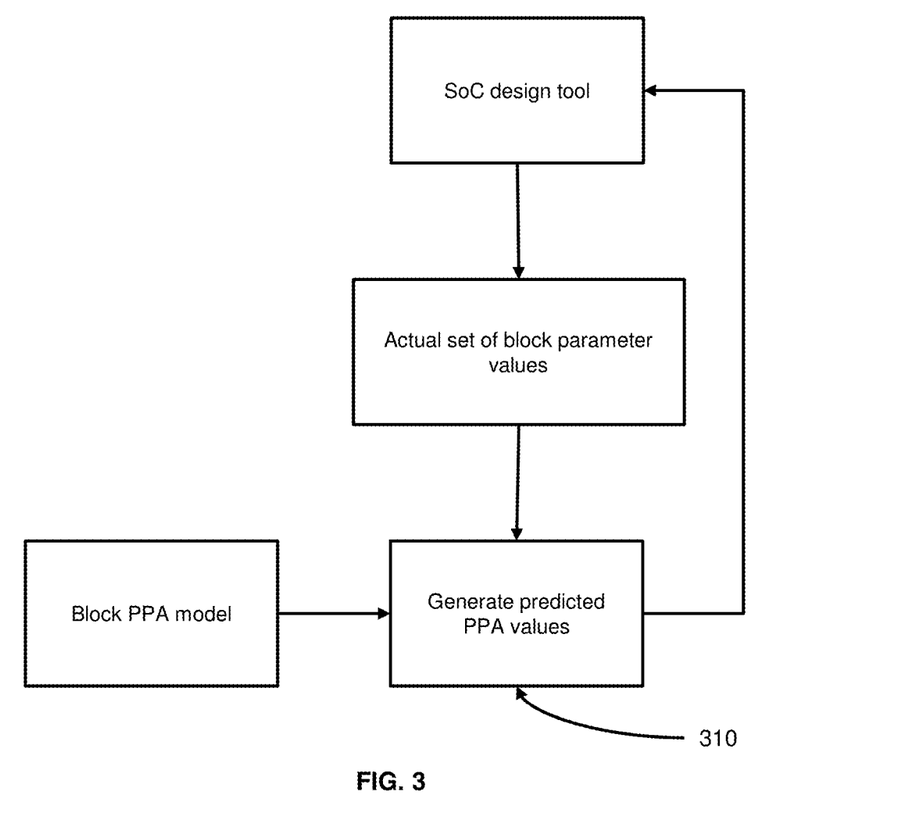
FIG. 3 shows a process for predicting PPA values based on parameter values using a model according to various aspects of the invention.

Referring now to FIG. 3, in accordance with various aspects of the invention, once the model is tested and deployed, then PPA estimations for IP components can be performed, which is based on providing characterization of the IP using the models. The design tool, such as an SoC design tool, provides an actual set of IP block parameter values to the model. The model predicts PPA values for the IP block based on the PPA model inputs. Thus, the model predicts the IP block's PPA behavior directly from the combined vector of its logical and physical parameter values. The model is able to do this because the model is trained on data obtained from running every component of the IP through synthesis and the PPA was collected and capture under multiple parameter variations.

Figure 5:
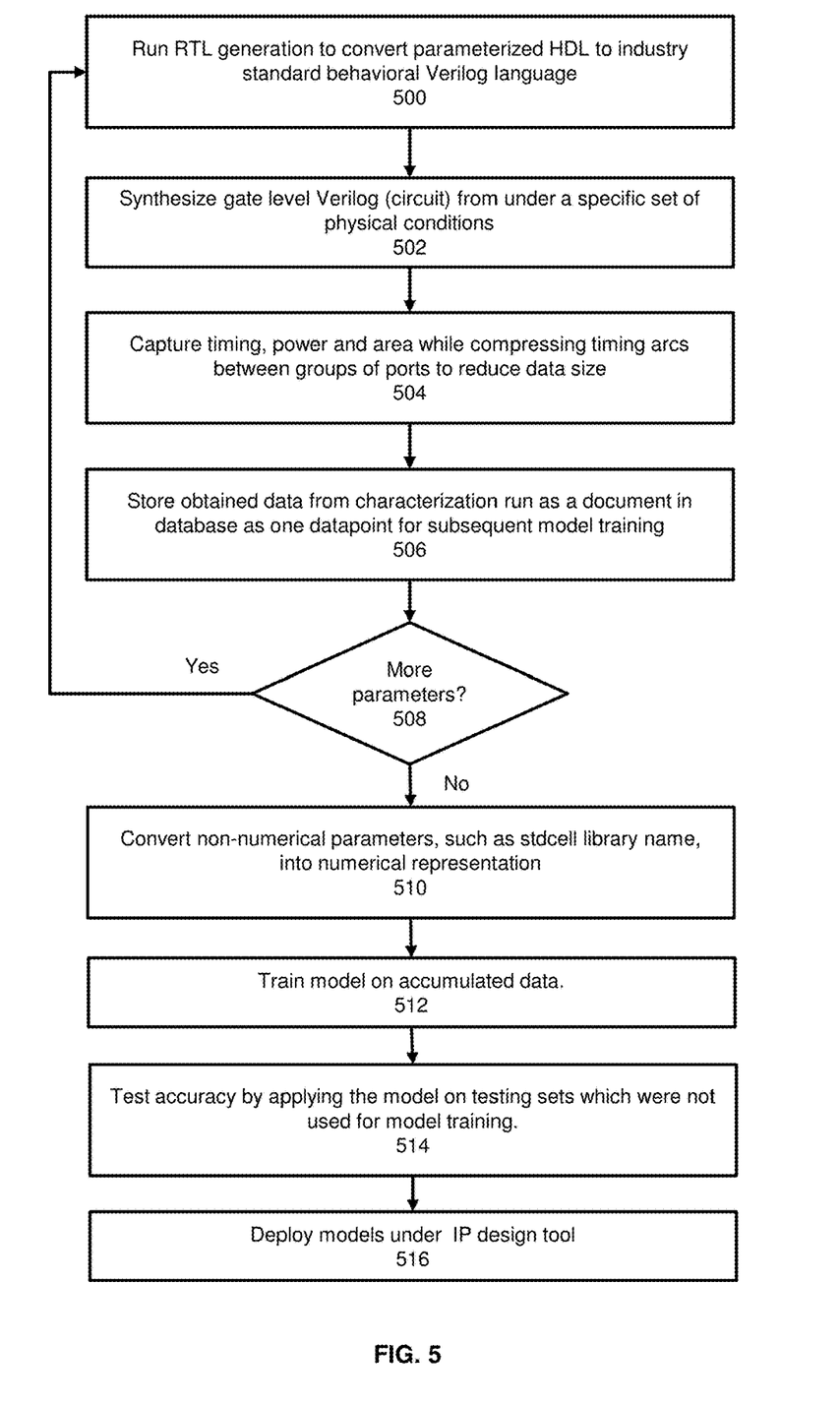
FIG. 5 shows a flow process for deployment of a model according to various aspects of the invention.

Referring now to FIG. 5, a process is shown in accordance with the various aspects of the invention for training and deploying a model. At step 500, the system runs RTL generation to convert parametrized HDL description of an IP block with a vector of logical parameter values to industry standard behavioral Verilog language. At step 502, the system synthesize gate level Verilog (circuit) from step 500 using a specific set of physical conditions. At step 504, the system captures timing, power and area while compressing timing arcs between groups of ports to reduce data size. The timing arcs are the delays between each the input ports and output ports of the IP block. In accordance with one embodiment, the compression selects the longest delay from all the delay measurements. At step 506, the system stores the acceptable obtained data from characterization runs as a document in noSQL database, which becomes one datapoint for subsequent training of the model. At step 508 the system determines if more combinations need to be processed and returns to step 800 for the remaining multiple combinations of logical and physical parameters. When all the combinations have been processed, the system moves to step 510. As step 510, the system converts non-numerical parameters, such as standard cell library name, into a numerical representation. As step 512, the system trains the model using the accumulated data. At step 514, the system tests the accuracy of the model that is trained by applying the model on testing sets, which were not used for model training. At step 516, if the model passes the testing stage, then the model is deployed under IP design tool of the system.

Some embodiments of physical machines described and claimed herein are programmable in numerous variables, combinations of which provide essentially an infinite variety of operating behaviors. Some embodiments of hardware description language representations described and claimed herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines, such as semiconductor chips; hardware description language representations of the logical or functional behavior of machines according to the invention described and claimed; and one or more non-transitory computer readable media arranged to store such hardware description language representations all can embody machines described and claimed herein.

The behavior of either or a combination of humans and machines; instructions that, if executed by one or more computers, would cause the one or more computers to perform methods according to the invention described and claimed; and one or more non-transitory computer readable media arranged to store such instructions embody methods described and claimed herein. Each of more than one non-transitory computer readable medium needed to practice the invention described and claimed herein alone embodies the invention.

Additionally, it is intended that such equivalents include both currently known equivalents and equivalents developed in the future, i.e., any elements developed that perform the same function, regardless of structure. The scope of the invention, therefore, is not intended to be limited to the exemplary embodiments shown and described herein.

In accordance with the teachings of the invention, a computer and a computing device are articles of manufacture. Other examples of an article of manufacture include: an electronic component residing on a mother board, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

The article of manufacture (e.g., computer or computing device) includes a non-transitory computer readable medium or storage that may include a series of instructions, such as computer readable program steps or code encoded therein. In certain aspects of the invention, the non-transitory computer readable medium includes one or more data repositories. Thus, in certain embodiments that are in accordance with any aspect of the invention, computer readable program code (or code) is encoded in a non-transitory computer readable medium of the computing device. The processor or a module, in turn, executes the computer readable program code to create or amend an existing computer-aided design using a tool. The term "module" as used herein may refer to one or more circuits, components, registers, processors, software subroutines, or any combination thereof. In other aspects of the embodiments, the creation or amendment of the computer-aided design is implemented as a web-based software application in which portions of the data related to the computer-aided design or the tool or the computer readable program code are received or transmitted to a computing device of a host.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Accordingly, the preceding merely illustrates the various aspects and principles as incorporated in various embodiments of the invention. It will be appreciated that those of ordinary skill in the art will be able to devise various arrangements, which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The scope of the invention, therefore, is not intended to be limited to the various aspects and embodiments discussed and described herein. Rather, the scope and spirit of invention is embodied by the appended claims.

What is claimed is:

1. A method for accumulating data used as a training set for training a machine learning model capable of determining one or more characteristics for any IP block, which has a set of input parameters, in order to optimize an IP block, the method comprising:
    determining a plurality of vectors of logical parameters for a plurality of IP arrangements;
    determining a plurality of vectors of physical parameters for the plurality of IP arrangements;
    generating a plurality of composite vectors based on the plurality of vectors of physical parameters and the plurality of vectors of logical parameters;
    synthesizing the plurality of composite vectors to generate a gate level netlist for each combination of the plurality of vectors of physical parameters and the plurality of vectors of logical parameters;
    generating a timing characterization for each gate level netlist to produce a plurality of timing characterizations; and
    updating the training set, in order to provide optimization characteristic for an IP block that is used to optimize the IP block, using data selected from a set including at least one of:
        the plurality of vectors of logical parameters;
        the plurality of vectors of physical parameters;
        the plurality of composite vectors; and
        the timing characterization.

2. The method of claim 1, wherein the logical parameters include a plurality of input ports for the IP block.

3. The method of claim 1, wherein the logical parameters include a plurality of output ports for the IP block.

4. The method of claim 1, wherein the physical parameters include library data for the IP block that is used in the step of synthesizing.

5. The method of claim 1 further comprising producing a plurality of characterizations for each synthesis that includes data for at least one of performance, power, and area.

6. The method of claim 5 further comprising compressing a plurality of timing arcs between input ports of the IP block and output ports of the IP block.

7. The method of claim 6, wherein compressing the plurality of timing arcs includes selecting a representative timing arc from the plurality of timing arcs.

8. The method of claim 7, wherein the representative timing arc is the slowest timing arc.

9. The method of claim 5 further comprising storing each of the plurality of characterization in a database.

10. The method of claim 1, wherein the physical synthesis is derived using a gate level net list.

11. The method claim 1 further comprising converting non-numerical parameters into numerical representation.

12. The method of claim 1 further comprising running a machine learning algorithm using the set of input parameters to derive one or more characteristic estimations for the IP block.

13. The method of claim 1 further comprising:
    using the plurality of timing characterizations, stored in a database, to train a prediction model; and
    predicting a timing characterization for a sample IP block using the timing characterizations.

14. A system for optimizing IP blocks comprising:
    memory for storing code;
    a processor in communication with the memory that executed the code that and accumulates data used as a training set for training a machine learning model capable of predicting one or more characteristics for any IP block, which includes a set of input parameters, in order to optimize an IP block design by causing the system to:
        generate a plurality of composite vectors based on physical parameters and logical parameters;
        synthesize the plurality of composite vectors to generate a gate level netlist for each of the plurality of composite vectors;
        generate a timing characterization for each gate level netlist to produce a plurality of timing characterizations;
        add at least one acceptable result to the training set, which is selected from a set of values including:
            the plurality of vectors of logical parameters;
            the plurality of vectors of physical parameters;
            the plurality of composite vectors, and
            the timing characterization; and
        run a machine learning algorithm, which is trained using the training set, for an IP block to identify one or more characteristic estimations that represent the IP block and is used for optimizing the IP block.

15. The system of claim 14 wherein execution of the code further causes the system to select a representative timing arc from a plurality of timing arc, wherein each timing arc is a timing delay between a plurality of input ports and a plurality of output ports of an IP block.

16. The system of claim 14, wherein the representative timing arc is the slowest.

17. A system for optimizing IP blocks comprising:
    memory for storing code;
    a processor in communication with the memory that executed the code that accumulates data used as a training set for training a machine learning model capable of predicting one or more characteristics for any IP block, which includes a set of input parameters, in order to optimize an IP block design by causing the system to:

generate a plurality of composite vectors based on physical parameters and logical parameters;

synthesize the plurality of composite vectors to generate a gate level netlist for each of the plurality of composite vectors;

generate a timing characterization for each gate level netlist to produce a plurality of timing characterizations;

run a machine learning algorithm, which is trained using the training set, on the set of input parameters; and derive one or more characteristic for the IP block that is used in optimizing the IP block design used in a system-on-chip (SoC).

18. The system of claim 17 wherein execution of the code further causes the system to add at least one of the plurality of vectors of logical parameters, the plurality of vectors of physical parameters, the plurality of composite vectors, and the timing characterization to the training set.

19. The system of claim 17 wherein execution of the code further causes the system to add at least one of the plurality of vectors of logical parameters, the plurality of vectors of physical parameters, the plurality of composite vectors, and the timing characterization to the training set when an acceptable result is obtained.

* * * * *